June 13, 1933.  A. J. PALUMBO  1,914,154
DUSTPROOF TRUNK MOLDING
Filed Nov. 4, 1932
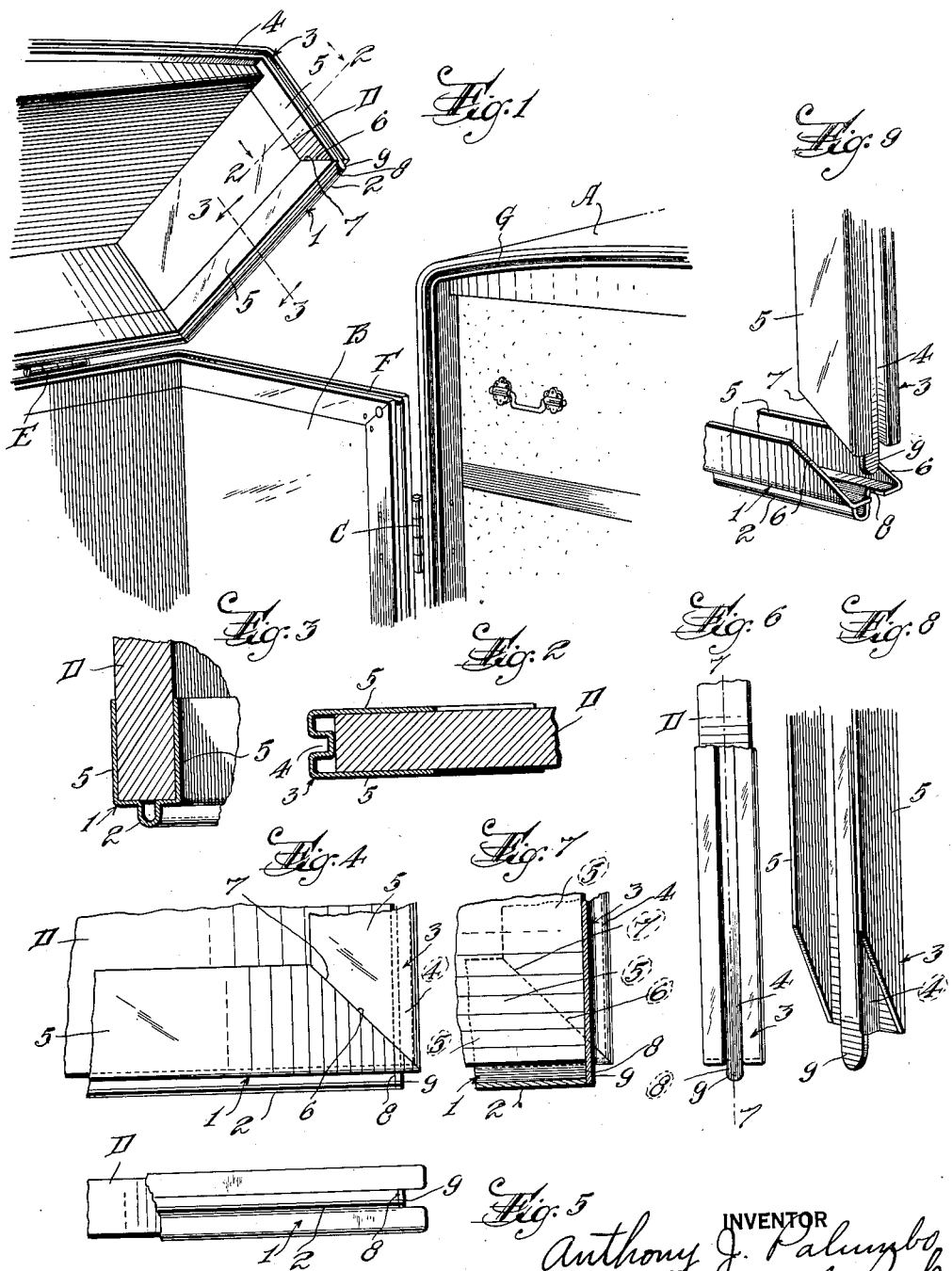
INVENTOR
Anthony J. Palumbo
BY Harry B. Rook
ATTORNEY Patented June 13, 1933

1,914,154

UNITED STATES PATENT OFFICE

ANTHONY J. PALUMBO, OF NEWARK, NEW JERSEY

DUSTPROOF TRUNK MOLDING

Application filed November 4, 1932. Serial No. 641,132.

This invention relates particularly to molding which is used on the meeting edges of the sections of a trunk for the purpose of excluding dust from the interior of the trunk when the trunk is closed, although the invention is susceptible of use for other purposes.

In trunks, particularly so called open top wardrobe trunks, a sheet metal molding is applied to the meeting edges of the trunk sections and the open top, the molding on one section or one part thereof having a groove, while the molding on another section or a part thereof has a rib to fit said groove when the sections are in such relation as to close the trunk. In many instances, it is necessary to apply a molding section having a groove to one edge of a trunk section and to apply another molding section having a rib to another edge of the trunk section which meets the first-mentioned edge at approximately right angles. Under such conditions, it is necessary to notch the end of the molding section having the rib so that the notch is in alignment with the groove in the other molding section, and when this is done an opening is left at the point where the two molding sections meet each other. This construction produces an unsightly appearance and leaves exposed edges on the two molding sections which might be easily battered or dented and on which garments or the fingers of the owner of the trunk might be cut and damaged. It has been proposed to overcome this difficulty by brazing a separate piece of metal to the two molding sections so as to close the opening between the sections; but this is costly and the brazing must be done before the molded sections are applied to a trunk so that it is difficult to adjust the molding to the trunk in case the angular relation of the molding sections and/or the length thereof do not exactly correspond to the angular relation and length of the respective edges of the trunk section.

The primary object of my invention is to provide a novel and improved construction of molding of the character described wherein one of the molding sections shall have means to close the opening at the juncture of the molding sections as and when the sections are applied to a trunk, whereby the construction of the molding and the application thereof to a trunk shall be simple, inexpensive and pleasing in appearance.

Other objects are to provide a molding of this character wherein the molding section having the groove is provided with a tongue at the end which abuts the end of another molding section which has a rib, so that the tongue shall overlie the end of said rib when the two sections are disposed in abutting relation; and to obtain other advantages and results as will be brought out by the following description.

For the purpose of illustrating the principles of my invention, I have shown it in connection with a known general type of molding and a known type of wardrobe trunk, but it should be understood that the invention may be applied to other forms of molding and to other articles than trunks without departing from the spirit or scope of invention.

Referring to the accompanying drawing in which corresponding and like parts are designated throughout the several views by the same reference characters, Figure 1 is a fragmentary perspective view of a top portion of a wardrobe trunk, showing the various sections thereof in open relation.

Figure 2 is an enlarged transverse vertical sectional view on the line 2—2 of Figure 1.

Figure 3 is a similar view on the line 3—3 of Figure 1.

Figure 4 is an enlarged fragmentary side elevation of two molding sections embodying the invention, showing them applied to a trunk.

Figure 5 is an edge elevation of one section of the molding shown in Figure 4.

Figure 6 is a similar view of the other section of the molding.

Figure 7 is a vertical longitudinal sectional view on the line 7—7 of Figure 6.

Figure 8 is a perspective view of the rear or underside of the molding section having the tongue, and Figure 9 is a composite perspective view of the meeting ends of the two molding sections showing the manner of assembling the sections.

Specifically describing the illustrated embodiment of the invention, the reference characters A and B designate the two main sections of a wardrobe trunk which are hingedly connected together in the usual manner by hinges C. One of the sections, in the present instance the section B has a cover or top D hingedly connected to said section by hinges E. The top D has an open front corresponding to the open front of the section B, and the front of the section B and cover D together correspond in size and shape to the front of the section A so that when the cover D is swung downwardly on the section B and the section A is swung toward the section B, the trunk may be completely closed.

The edges of the walls of the section B have secured thereon a dust proof molding F having a groove, while the edges of the walls of the section A have a complemental dust-proof-molding G which has a rib to fit the groove of the molding F when the trunk is closed. The lower edge of the cover D has a molding 1 provided with a rib 2, while the front edges of the cover have applied thereto a molding 3 which has a groove 4. The rib 2 of the molding 1 is arranged to fit the molding F on the section B, while the rib 4 of the molding 3 is arranged to fit the rib of the molding G.

As shown, the molding consists of sheet material suitably bent to form the ribs 1 and groove 4 and side flanges 5 to embrace the corresponding edges of the trunk cover. In applying the molding to the trunk cover, the end of the section I to be arranged at the front of the cover is mitered at 6 to abut the correspondingly mitered end 7 of the piece of molding 3, so that said molding sections 1 and 3 may be disposed at approximately right angles to each other with the rib 2 and groove 4 in approximately the same plane. It is necessary to form a notch 8 in the end of the section 1 to register with the groove 4 of the section 3, so that the rib G of the trunk section A may enter the groove 4. This notch 8 and the mitering of the grooved section 3 causes an opening to be formed at the juncture of the two pieces 1 and 3 when they are applied to the trunk cover. This opening is unsightly and produces sharp exposed edges upon which the hand or clothing of the owner of the trunk might be torn, and furthermore the edges of the opening being fully exposed may be easily dented or battered.

In accordance with the invention, I provide means on the grooved section 3 for closing said opening which is formed at the juncture of the two sections 1 and 3 when the sections are applied to the trunk cover. As shown on the drawing, this means comprises a tongue 9 which is formed integrally with the section 3 and projects from the base of the groove 4 so as to overlie or abut the end edges of the rib 2 of the section 1, and the tongue 9 is of course of approximately the same shape and size as the cross sectional outline of the rib 1. This tongue 9 will thus effectually close the opening formed by the rib 1 and also will reenforce the edges of the rib. At the same time, the formation of the tongue at the base of the groove 4 avoids the opening caused by mitering of the section 3, and causes the end edges of the sections to nicely abut so as to provide a neat appearing corner as well as a strong joint between the sections.

The tongue 9 and notch 8 can be formed during the manufacture of the piece of molding. Obviously the two pieces of molding 1 and 3 can be fitted together and individually adjusted to conform to the angular corner and the edges of the trunk section as the sections are applied to the trunk. Also, the structure is inexpensive and the molding can be easily and quickly applied to the trunk.

While I have shown and described the invention as embodied in certain details of construction it should be understood that this is primarily for illustrating the principles of the invention and that the details of construction may be modified and changed by those skilled in the art without departing from the spirit or scope of the invention.

Having thus described my invention, what I claim is:

1. The combination of two pieces of molding formed of sheet material, one having a longitudinal groove and the other having a similarly shaped rib, one end of each piece being in abutting angular relation to one end of the other piece with said rib and groove in approximately a common plane, the second mentioned piece having a notch in said end registering with the groove in the first-mentioned piece and the first-mentioned piece having an integral tongue at the base of said groove located in said notch and overlying the adjacent end of said rib of the other piece.

2. The combination of two pieces of molding formed of sheet material, one having a longitudinal groove and the other having a similarly shaped rib, one end of each piece being in abutting angular relation to one end of the other piece with said rib and groove in approximately a common plane, the second-mentioned piece having a notch in said end registering with the groove in the first-mentioned piece and the first-mentioned piece having an integral tongue at the base of said groove corresponding in size and shape with the size and shape of the cross-sectional outline of said rib of the other piece located in said notch and overlying the adjacent end of said rib.

3. The combination of two pieces of molding formed of sheet material, one having a longitudinal groove and the other having a similarly shaped rib, one end of each piece being mitered and in abutting approximately right angular relation to one end of the other piece with said rib and groove in approximately a common plane, the second-mentioned piece having a notch in said end registering with the groove in the first-mentioned piece and the first-mentioned piece having an integral tongue at the base of said groove located in said notch and overlying the adjacent end of said rib of the other piece.

4. The combination of two pieces of molding formed of sheet material, one having a longitudinal groove and the other having a similarly shaped rib, one end of each piece being mitered and in abutting approximately right angular relation to one end of the other piece with said rib and groove in approximately a common plane, the second-mentioned piece having a notch in said end registering with the groove in the first-mentioned piece and the other of said pieces having a portion to close the opening formed at the juncture of said ends of said groove and said rib.

ANTHONY J. PALUMBO.